(12) United States Patent
Kube et al.

(10) Patent No.: US 9,905,134 B2
(45) Date of Patent: Feb. 27, 2018

(54) SYSTEM AND METHOD OF PREVENTING AND REMEDYING RESTRICTED AREA INTRUSIONS BY UNMANNED AERIAL VEHICLES

(71) Applicant: Aerobotic Innovations, LLC, Fargo, ND (US)

(72) Inventors: Alexander J. Kube, Fargo, ND (US); Luke Huls, Moorhead, MN (US); Shawn P. Muehler, Fargo, ND (US)

(73) Assignee: AEROBOTIC INNOVATIONS, LLC, Fargo, ND (US)

( * ) Notice: Subject to any disclaimer, the term of this patent is extended or adjusted under 35 U.S.C. 154(b) by 0 days.

(21) Appl. No.: 15/043,310

(22) Filed: Feb. 12, 2016

(65) Prior Publication Data

US 2016/0240087 A1 Aug. 18, 2016

Related U.S. Application Data

(60) Provisional application No. 62/115,552, filed on Feb. 12, 2015, provisional application No. 62/213,401, filed on Sep. 2, 2015.

(51) Int. Cl.

| | |
|---|---|
| *G08G 5/00* | (2006.01) |
| *G05D 1/10* | (2006.01) |
| *B64C 39/02* | (2006.01) |
| *G05D 1/00* | (2006.01) |

(52) U.S. Cl.
CPC .......... *G08G 5/006* (2013.01); *B64C 39/024* (2013.01); *G05D 1/0011* (2013.01); *G05D 1/0022* (2013.01); *G05D 1/101* (2013.01); *G08G 5/0052* (2013.01); *G08G 5/0069* (2013.01)

(58) Field of Classification Search
CPC .... G08G 5/006; G08G 5/0069; G05D 1/0011; G05D 1/101; B64C 39/024
See application file for complete search history.

(56) References Cited

U.S. PATENT DOCUMENTS

| | | | | |
|---|---|---|---|---|
| 5,890,441 | A * | 4/1999 | Swinson | B64C 29/0025 244/12.1 |
| 7,127,334 | B2 * | 10/2006 | Frink | B64D 45/0015 342/29 |
| 7,818,099 | B2 * | 10/2010 | Kemp | B64D 45/0015 340/945 |
| 8,989,053 | B1 * | 3/2015 | Skaaksrud | H04W 12/06 370/255 |
| 9,257,048 | B1 * | 2/2016 | Offer | G08G 5/0021 |

(Continued)

*Primary Examiner* — Anne M Antonucci
(74) *Attorney, Agent, or Firm* — Billion & Armitage; Michael A. Collins

(57) ABSTRACT

An intrusion prevention system includes an unmanned aerial vehicle (UAV), a UAV controller, and a restricted area data aggregator. The restricted data aggregator collects and stores restricted area data. The UAV controller is coupled to communicate with the UAV and the restricted area data aggregator, wherein the UAV controller receives positional data from the UAV and restricted area data from the restricted area aggregator. The UAV controller determines based on the received positional data and the received restricted area data whether the UAV is currently intruding within a restricted area or is predicted to intrude within a restricted area and wherein the UAV controller initiates actions to prevent unauthorized intrusions into restricted areas.

19 Claims, 6 Drawing Sheets

(56) References Cited

U.S. PATENT DOCUMENTS

| | | | |
|---|---|---|---|
| 2009/0210109 A1* | 8/2009 | Ravenscroft | G01C 21/005 701/26 |
| 2012/0158280 A1* | 6/2012 | Ravenscroft | G01C 21/005 701/400 |
| 2014/0306799 A1* | 10/2014 | Ricci | B60Q 1/00 340/5.83 |
| 2015/0246727 A1* | 9/2015 | Masticola | B64C 39/024 701/2 |
| 2015/0254988 A1* | 9/2015 | Wang | G05D 1/0214 701/3 |
| 2015/0350914 A1* | 12/2015 | Baxley | H04W 12/08 726/11 |
| 2016/0070265 A1* | 3/2016 | Liu | B64C 39/024 701/3 |
| 2016/0117853 A1* | 4/2016 | Zhong | B64C 39/024 345/634 |

* cited by examiner

SYSTEM AND METHOD OF PREVENTING AND REMEDYING RESTRICTED AREA INTRUSIONS BY UNMANNED AERIAL VEHICLES

CROSS-REFERENCE TO RELATED APPLICATIONS

This application claims priority to U.S. Provisional Application No. 62/115,552, filed on Feb. 12, 2015, and entitled "SYSTEM FOR PREVENTING AND REMEDIATING RESTRICTED GEOGRAPHIC AREA INTRUSIONS BY UNMANNED VEHICLES," and U.S. Provisional Application 62/213,401, filed on Sep. 2, 2015, and entitled "SYSTEM AND METHOD OF PREVENTING AND REMEDYING RESTRICTED AREA INTRUSIONS BY UNMANNED AERICAL VEHICLES", the disclosures of which are hereby incorporated by reference in their entirety.

TECHNICAL FIELD

The present disclosure is related generally to restricted area intrusion avoidance systems, and more specifically to systems and methods for restricted area intrusion avoidance in unmanned aerial vehicles.

BACKGROUND

Unmanned aerial vehicles (UAVs), once utilized solely in military applications, are becoming more ubiquitous in everyday life. Although a variety of names have been used to describe these systems and devices, such as remotely piloted aircraft, unmanned aircraft, or drone, the common characteristic between each is that no pilot is present within the aircraft. Rather, they are controlled either autonomously by onboard computers or by the remote control of a pilot on the ground or in another vehicle.

One of the concerns with the proliferation of UAVs, however, is how to prevent operation of UAVs within restricted areas. Currently, UAV pilots are required to make themselves aware of airspace restrictions and monitor the location of the UAV to prevent operation within restricted areas. However, this is an error-prone process, and one that requires the pilot to be aware of airspace restrictions.

It would therefore be beneficial to develop a system that provides collision avoidance for UAVs without requiring the addition of on-board collision avoidance sensors.

DETAILED DESCRIPTION

Figure 1:
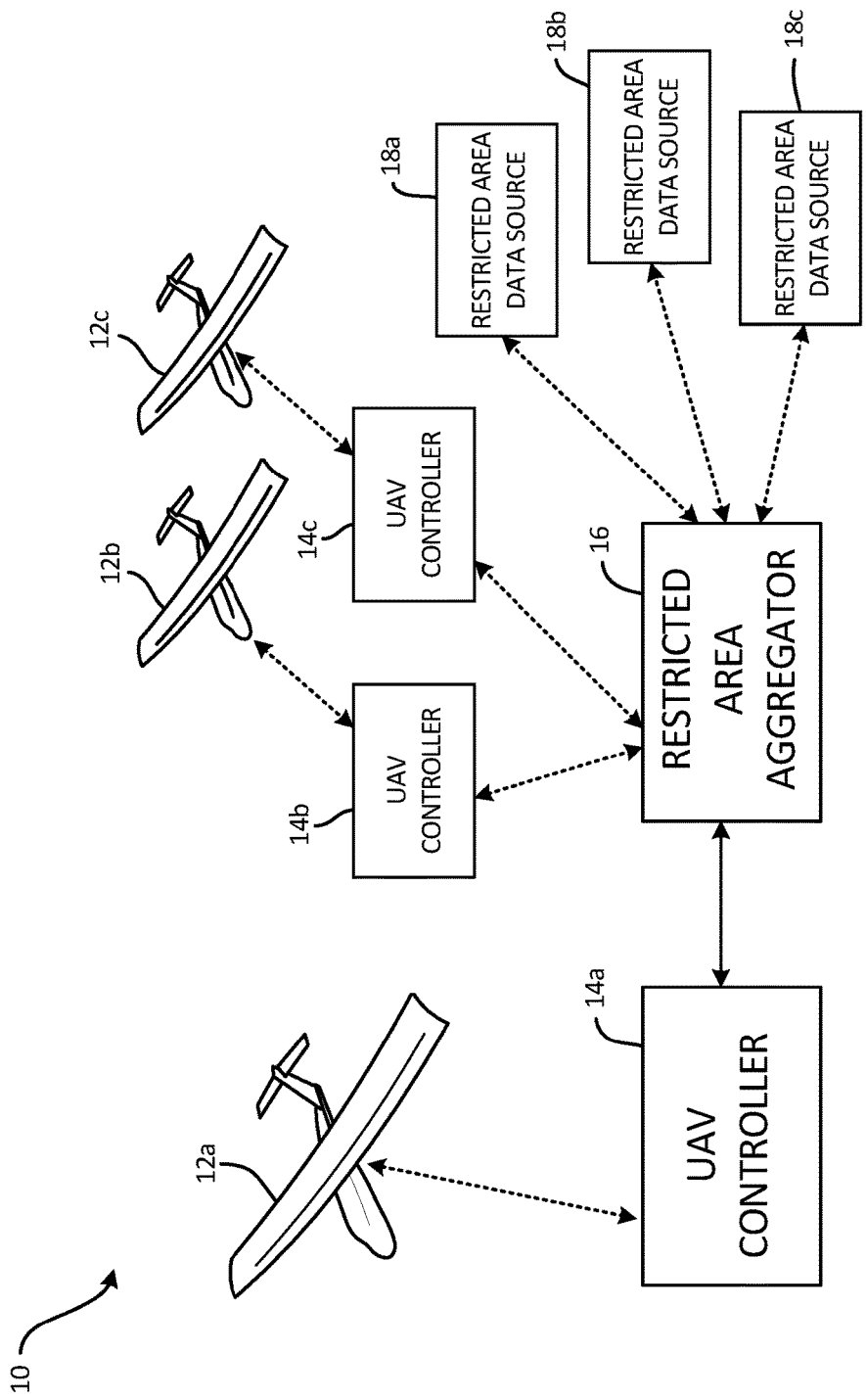
FIG. 1 is a schematic diagram illustrating a restricted area avoidance system according to an embodiment of the present invention.

FIG. 1 is a schematic diagram illustrating restricted area avoidance system 10 according to an embodiment of the present invention. In the embodiment shown in FIG. 1, restricted area avoidance system 10 includes one or more unmanned aerial vehicles (UAVs) 12a, 12b, and 12c (generally, UAVs 12), one or more UAV controllers 14a, 14b, and 14c (generally, UAV controller 14), restricted area aggregator 16, and one or more third party restricted area data sources 18a, 18b, 18c. For purposes of this discussion, collision avoidance system 10 will be described with respect to interactions between UAV 12a and UAV controller 14a, although these interactions would be approximately the same between any respective pair of UAV and UAV controller.

Figure 2:
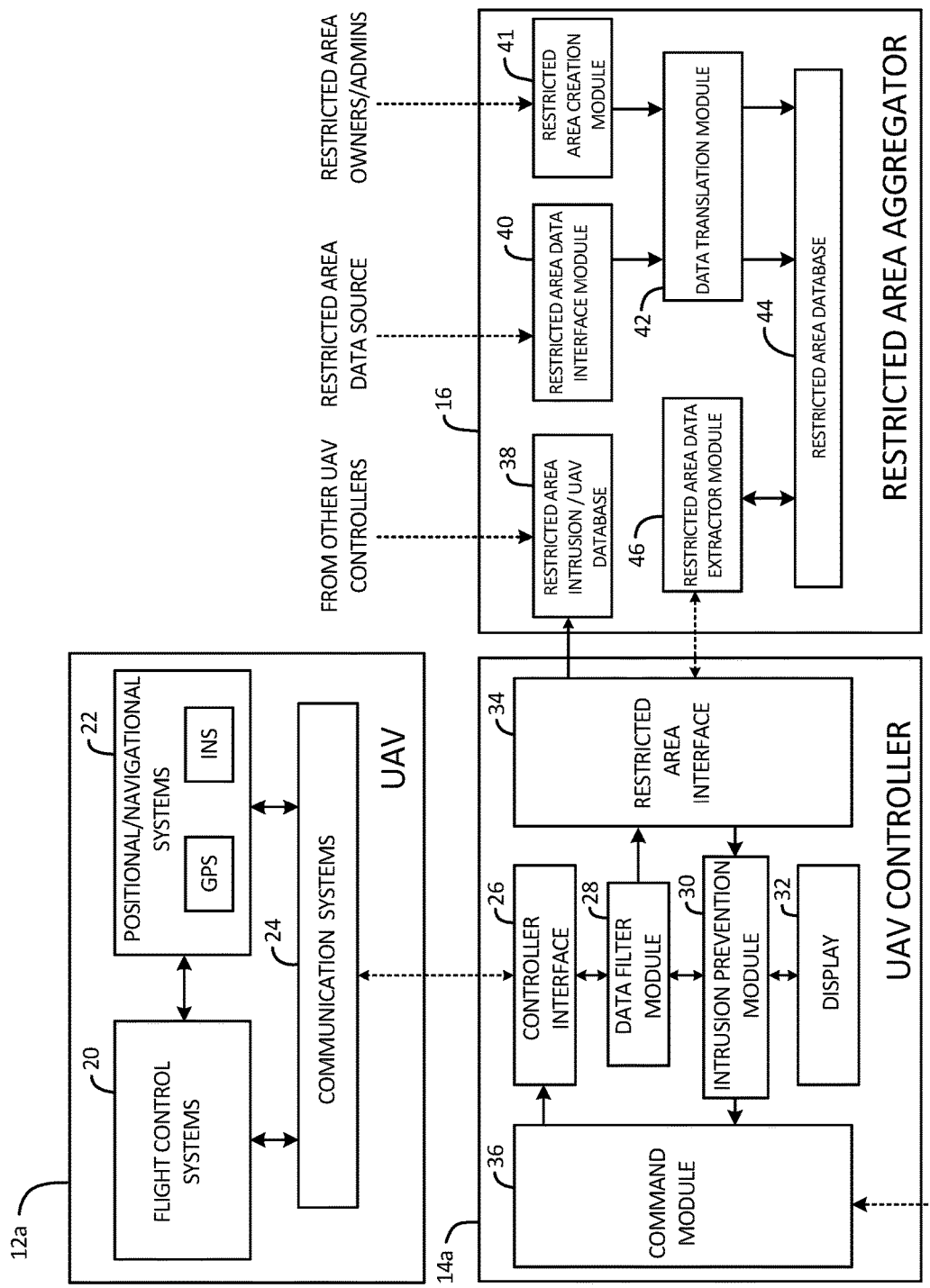
FIG. 2 is a block diagram that illustrates additional details of a restricted area avoidance system according to an embodiment of the present invention.

As described in more detail with respect to FIG. 2, each UAV 12 is coupled to communicate bi-directionally with a respective UAV controller 14. UAV 12a communicates status information/feedback to UAV controller 14a, which includes flight data defined broadly to include at least positional data and may also include data related to heading (i.e., direction), speed, and/or orientation, as well as any other information related to the operation and flight of UAV 12. In turn, UAV controller 14a provides flight control information to UAV 12a, which may include specific instructions on controlling flight control surfaces, or may include more general instructions such as desired speed, heading, position, etc. of UAV 12a. Communication between UAV 12a and UAV controller 14a may be according to a variety of well-known communication means, including Wi-Fi, cellular, or other radio frequency means. In addition, data may be formatted for communication via according to a variety of well-known aviation standards, including MAVLINK, UAVLink, or other well-known standards.

UAV controller 14a is additionally coupled to communicate with restricted area aggregator 16. Communication between UAV controller 14a and restricted area aggregator 16 may be continuous or transient. In one embodiment, UAV controller 14a communicates via the Internet with restricted area aggregator 16, although other communication means may be utilized. A variety of information may be communicated between UAV controller 14a and restricted area aggregator 16. Restricted area aggregator 16 maintains a geographic database of restricted areas, at least a part of which is communicated to UAV controller 14a to aid in preventing breaches of restricted areas. In one embodiment, restricted area aggregator 16 further maintains information on how to request access to enter restricted area identified in the geographic database. As described in more detail below, UAV controller 14a may simply be required to provide notification that the UAV will be entering a particular restricted area. In other embodiments, UAV controller 14a may be required to request permission to enter a restricted area, pending approval by the owner of the restricted area.

In the embodiment shown in FIG. 1, restricted area aggregator 6 receives restricted area data from one or more restricted area data sources 18a, 18b, and 18c. Restricted area data sources 18 may include remote publishers of restricted area data such as government operated databases and private third-party databases. In addition, as described in more detail with respect to FIG. 2, restricted area aggregator 16 may include an interface that allows owners of restricted areas to create restricted areas, describe the geographic boundaries of the restricted area either graphically or via upload of a designated file, and define restrictions associated with the restricted area. Restricted area data is then stored in a restricted area database.

In addition, restricted area aggregator 16 may maintain a geographic database of restricted area intrusions. Restricted area aggregator 16 may make determinations locally regarding whether a restricted area has been violated based on positional information received from individual UAV controllers. In other embodiments, individual UAV controllers 14, monitoring the position of a respective UAV 12 may determine whether a restricted area has been violated and may provide notice of the restricted area intrusion to restricted area aggregator 16. Incidences of restricted area violations are recorded by restricted area aggregator 16, which may include information identifying the restricted area violated, the location of the violation, and identification of the UAV responsible for the violation. The restricted area intrusion database may in addition include a UAV database that includes identifying information related to registered UAVs, including owner of the UAV, identifying information, etc. This information may be included with the intrusion database, or may be maintained separately from the intrusion database.

UAV controller 14a utilizes the restricted area data provided by restricted area aggregator 16 to prevent intrusions into restricted areas. As discussed in more detail below, this may include utilizing procedures communicated by restricted area aggregator 16 to request access to enter restricted areas. In addition, this may include providing information to the pilot regarding the location of restricted areas, and may in some embodiments include providing command instructions to prevent intrusion and/or remedy intrusions of UAV 12 into restricted areas. In this way, the restricted area avoidance system 10 provides a system and method of collecting and distributing restricted area information to UAV controllers 14 and utilizing the received information to prevent unauthorized intrusion into restricted areas.

FIG. 2 is a block diagram that illustrates additional details of restricted area avoidance system 10 according to an embodiment of the present invention. In the embodiment shown in FIG. 2, UAV 12a includes flight control systems 20, positional/navigational systems 22, and communications system 24. In addition, UAV controller 14a includes controller interface 26, data filter module 28, intrusion prevention module 30, display 32, restricted area interface 34, and UAV command module 36. Restricted area aggregator 16 includes UAV restricted area intrusion/UAV database 38, restricted area data interface module 40, restricted area creation module 41, data translation module 42, restricted area database 44, and restricted area extractor module 46. As described in more detail below, UAV controller 14a may be implemented on a hand-held device such as a tablet, laptop, or other mobile device capable of communicating wirelessly with UAV 12a. The hand-held device necessarily includes a processor, memory, and other components required to implement certain functions, such as those performed by controller interface 26, data filter module 28, intrusion prevention module 30, restricted area interface 34 and command module 36. Similarly, restricted area aggregator may be implemented on any suitable computer system, typically, remote from UAV controller 14a. Restricted area aggregator includes processor, memory and other components required to implement certain functions, such as restricted area intrusion database 38, restricted area data interface module 40, restricted area creation module 41, data translation module 42, restricted area database 44, and restricted area data extractor module 46.

In the embodiment shown in FIG. 2, UAV 12a is configured to monitor its position via positional/navigational system 22, which may utilize one or more of global positioning system (GPS) 50, inertial navigation system (INS) 52, other well-known positional sensors, and/or combinations thereof. As well understood, GPS system 50 utilizes signals received from three or more satellites to determine the three-dimensional location of the UAV 12a, which can be monitored over time to determine other safety data such as speed and direction of UAV 12a. INS 52 includes motion sensors (e.g., accelerometers) and rotational sensors (e.g., gyroscopes) to determine the orientation, speed, and velocity (direction and speed) of UAV 12a. These systems may be used in either alone or in conjunction with one another to generate positional data, which may include in addition to position of UAV 12a, the heading, speed, and/or orientation of UAV 12a.

In addition, positional/navigation system 22 may be utilized to provide flight commands to flight control systems 20. While in some embodiments flight control systems, such as engine speed and flight control surfaces, are controlled directly by a user via UAV controller 14a, in other embodiments the commands provided by a user are with respect to a desired position, orientation, or speed of UAV 12a. In these embodiments, commands received from UAV controller 14a via communication system 24 are provided to positional/navigation system 22, which compares the commands to current position, orientation, and/or speed of UAV 12a and in response generates commands provided to flight control systems 20. As described in more detail below, in one aspect of the present invention, in response to a detected or predicted intrusion of a restricted area, UAV controller 14a will generate a "safe position" command that is provided to flight control systems 20 via communication system 24. The "safe position" command provides the coordinates calculated by UAV controller to prevent or remedy the intrusion. Based on the current position, orientation and direction of UAV 12a, positional/navigation system 22 generates commands provided to flight control systems 20 to control aspects such as engine speed and flight control surfaces. However, it should be understood that in other embodiments this functionality may be located as part of flight control systems 20.

Communication system 24 is responsible for providing bi-directional communication with UAV controller 14a. In one embodiment, communication system 24 utilizes Wi-Fi, a cellular modem, or other well-known radio-frequency communication standards. In the embodiment shown in FIG. 2, communication system 24 receives positional data from positional/navigation system 22, which as discussed above may include position, orientation, heading and/or speed of the aircraft. This information is aggregated with additional diagnostic information associated with UAV 12a and communicated by communications system 24 to UAV controller 14a. A variety of well-known communication protocols may be utilized, including the MAVLink communication protocol, UAVLink, or others. Communication system 24 may be programmed to communicate aggregated data to UAV controller 14a at regular intervals, or may be programmed to communicate in response to a request from UAV controller 14a.

In the embodiment shown in FIG. 2, UAV controller 14a is implemented on a hand-held device such as a tablet, laptop, or other mobile device capable of communicating wirelessly with UAV 12a. However, in other embodiments the software and hardware components utilized to implement UAV controller 14a may be embodied on a traditional desktop-type workstation or server. Controller interface 26 implemented within UAV controller 14a provides bi-directional communication between UAV 12a and UAV controller 14a. In one embodiment, controller interface 26 is configured to monitor communications received from UAV

12a, and provide a notification to data filter module 28 when new data is received from UAV 12a.

Data filter module 28, in response to a notification from controller interface 26 that new data has been received, determines whether the received data includes data relevant to intrusion avoidance (e.g., positional data, which may include altitude, position, speed, and direction data). If relevant to intrusion avoidance, positional data is extracted from the aggregated communication by data filter module 28 and provided to restricted area interface 34 and intrusion prevention module 30. In one embodiment, restricted area interface 34 communicates positional information to restricted area aggregator 34 for the purpose of identifying geographically relevant restricted area information—as opposed to receiving all restricted area information. However, in other embodiments restricted area interface 34 is not required to provide positional information to restricted area aggregator 16. Rather, restricted area interface 34 is only required to receive restricted area information from restricted area aggregator 16. In addition, positional data is provided to intrusion prevention module 30 to be compared with restricted area information received from restricted area aggregator 16 such that intrusion of UAV 12 into restricted areas is prevented.

Intrusion prevention module 30 receives the positional information provided by UAV 12a as well as restricted area data provided by restricted area aggregator 16, as described in more detail below. In one embodiment, intrusion prevention module 30 includes a local database (not shown) for storing restricted area data provided by restricted data aggregator 16. This may include restricted area data geographically relevant to the area in which UAV 12a is operating, or may include all geographic data aggregated by restricted data aggregator 16. Intrusion prevention module 30 utilizes the positional data received from UAV 12a and the restricted area data to make determinations regarding intrusions—both current and predicted—into restricted areas. In addition, intrusion prevention module provides information regarding the position of UAV 12 and the location/boundaries of restricted areas to display 32 to alert the pilot to the proximity of restricted areas relative to the position of UAV 12, and may provide information regarding notifications/permissions required to access restricted areas. Alerts and/or notifications may be presented in the form of a text notification, changing an icon in the user interface, sounding an auditory alarm, and/or changing the outline color, fill color, or opacity of one or more restricted area. In addition, intrusion prevention module 30 will determine if immediate action is required in order to prevent and/or remedy an unauthorized intrusion into a restricted area. If immediate action is required, this may include generating a "safe location" outside of the restricted area, and providing this safe location to command module 36 to automatically control UAV 12 to navigate to the safe location. If a response is required, this may similarly be displayed to the user via display 32 as one or more interactive elements such as a button or icon that allows the user/pilot to determine whether to ignore the notification or change heading/direction/altitude as suggested.

When analyzing position data from UAV 12a to determine whether UAV 12a has entered a restricted area, intrusion prevention module 30 utilizes the most recent position information received from UAV 12a as well as an extract of locally stored restricted area data. The extract of data represents a sub-set of all restricted area data that is geographically relevant to the position of UAV 12a. In one embodiment, by extracting a sub-set of data from the local database, the amount of data that must be analyzed by intrusion prevention module 16 is reduced substantially.

In one embodiment, intrusion prevention module 36 interacts with display 32 to visually illustrate information related to intrusion prevention. For example, this may include visual displays illustrating the location of UAV 12a in relation to restricted area as well as alarms and/or alerts notifying the user of potential intrusions. In addition, intrusion prevention module 36 may display visually routes available to the user to avoid intrusion into restricted areas. In another embodiment, if determined that the likelihood of restricted area intrusion is high enough, intrusion prevention module 30 may generate a "safety point" command. In this embodiment, the safety point command has the effect of overriding commands provided by the remote pilot, and automatically directing UAV 12a to a location that prevents intrusion into restricted areas. During normal operations, command module 36 receives commands from a user via an input device that it translates and provides to controller interface 26 for provision to UAV 12a.

In the embodiment shown in FIG. 2, restricted area aggregator 16 is located remotely from UAV controller 14a. As discussed above, bi-directional communication between restricted area aggregator 16 and UAV controller 14a may be according to a variety of well-known communication standards (e.g., Internet). Restricted area aggregator 16 may be implemented with a combination of hardware and software including one or more computers, servers, etc.

In the embodiment shown in FIG. 2, restricted area aggregator 16 utilizes a pair of geographic databases, including restricted area intrusion/UAV database 38 and restricted area database 44. Both the restricted area intrusion/UAV database 38 and the restricted area database 44 interact directly or indirectly with restricted area interface 34. Restricted area intrusion/UAV database 38 maintains records related to intrusions within restricted areas by UAVs, as well as information related to the identification of UAVs UAV owner information, UAV type, etc.). This may include recording identifying information related to the intruding UAV and/or pilot, the time of the intrusion and/or duration of the intrusion, and location of the intrusion. In the embodiment shown in FIG. 2, each individual UAV controller 14 is responsible for providing information related to restricted area intrusions to restricted area intrusion database 38. In other embodiments, rather than each UAV controller 14 being responsible for providing intrusion information, each UAV controller 14 simply provides location/position information, which is analyzed by restricted area intrusion database 38 to determine whether an intrusion has taken place. If an intrusion is detected, then restricted area intrusion database 38 records information related to the intrusion. In addition, in response to a recorded intrusion, restricted data aggregator 16 may generate a notification or alert that is communicated to the owner of the restricted area and/or to a third party system to alert the parties of the restricted area intrusion.

Restricted area database 44 is responsible for maintaining a record of restricted areas. In one embodiment, restricted area database 44 is a geographic database that is searchable by location or proximity to a location. In the embodiment shown in FIG. 2, restricted area database 44 receives restricted area data from one or more restricted area data sources 18, which interact with restricted area data interface module 40 and data translation module 42 to provide restricted area data to restricted area database 44. Areas identified as restricted by the owner may be saved to the restricted area database 44 in the same way that restricted area data received from restricted area data sources (e.g., provided by remote publishers of restricted area data) are stored to restricted area database 44. Restricted area data interface module 40 may periodically make requests to restricted area data sources 18 for restricted area updates, or may receive notification indicating that new information or updates are available from a particular data source 18.

In addition, restricted area creation module 41 allows owners of areas to interact with restricted area database 44 via data translation module 42 to identify restricted areas and define the restrictions associated with each restricted area. As described in more detail below, a graphical user interface may be provided by restricted area creation module to allow owners to identify and set these restrictions.

Data translation module 42 is responsible for translating the received restricted area data whether received from restricted area data sources or from the owners directly—into a common format for storage to restricted area database 44. Restricted area data stored by restricted area database 44 includes identification of the area (e.g., boundaries) of the restricted area. In addition, restricted area data may also include information regarding the owner of the restricted area, the type of restrictions placed on the area (e.g., altitude, speed, type of vehicles allowed, etc.) as well as information regarding how to request access to enter the restricted area.

In the embodiment shown in FIG. 2, restricted area extractor module 46 interacts with individual UAV controllers 14 via restricted area interface 34 to provide restricted area data to the controllers. In one embodiment, restricted area extractor module 46 receives—either upon initialization or continually UAV location information from UAV controller 14 and in response extracts geographically relevant restricted area data from restricted area database 44. In this way, UAV controller 14a is not required to store and maintain complete information regarding restricted areas, but rather is only required to store and maintain information geographically relevant to the location of UAV 12a. In other embodiments, UAV controller 14a (in particular, intrusion prevention module 30) is capable of storing all restricted area data. When new restricted area data becomes available, UAV controller 14a compares the new restricted area data within the restricted area data already stored locally by intrusion prevention module 30. If the new restricted area data relates to a geographic area already stored by intrusion prevention module 30, then the record related to the geographic area is either deleted or modified based on the newly received restricted area data. If the new restricted area data does not refer to a geographic area previously stored, then the new restricted area data is simply added to the local database.

In this way, restricted area avoidance system 10 provides a system of aggregating restricted area data—collected from one or more restricted area data sources and disseminating the information to UAV controllers 14. In response, UAV controllers 14 utilize the received restricted area data to prevent and remedy intrusions into restricted areas.

FIGS. 3A-3D represent a flowchart that illustrates steps performed by restricted area avoidance system according to an embodiment of the present invention. Throughout the description of the flowchart illustrated in FIGS. 3A-3D, reference is made to components described with respect to FIG. 2. While the plurality of steps are numbered, it should be understood that the numbered steps do not imply an order in which the steps are required to be performed, and in fact many are implemented simultaneously.

At step 50, positional data associated with UAV 12 is generated. As described above, positional/safety information may be generated via one or more on-board sensors (e.g., GPS, INS, etc.), and may be generated periodically. Positional information may include information related to position, airspeed, altitude and/or direction of UAV 12a.

At step 52, positional data is aggregated with other on-board data for transmission from UAV 12 to UAV controller 14. In one embodiment, positional data is aggregated with other on-board data only when it provides an update to a previous position.

At step 54, aggregated data is transmitted from UAV 12a to UAV controller 14a via a wireless communication link. As described above, any one of a variety of well-known wireless communication standards may be employed (e.g., Wi-Fi, cellular, etc.). Transmission from UAV 12a to UAV controller 14a may be initiated periodically or on demand from UAV controller 14a. In one embodiment, UAV 12a is configured to provide periodic updates at an interval not to exceed 300 milliseconds.

At step 56, aggregated data is received by UAV controller 14a via controller interface 26 (shown in FIG. 2). At step 58, aggregated data is filtered to identify positional data. As described above, in some embodiments positional data may also include data related to direction and/or speed of UAV 12a. At step 60, a determination is made whether the aggregated data included data relevant to restricted area intrusion. In some embodiments, aggregated data communicated from UAV 12a to UAV controller 14a will not always include positional data. This may result from, for example, GPS sensor 50 providing updates at a longer interval than other updates included in the aggregated data. If at step 60 it is determined that the aggregated data does not include data relevant to restricted area intrusion (e.g., does not include updated positional data), then no further action is taken on this data as indicated by stop 62. If at step 60 it is determined that the aggregated data does include data related to restricted area intrusion (e.g., does include positional data), then at step 64 data the positional data is communicated to intrusion prevention module 30. In addition to receiving positional information, intrusion prevention module 30 also receives restricted area data from restricted area data interface 46. An embodiment illustrating the collection of restricted area from a plurality of sources and dissemination to UAV controllers 14 is provided by steps 68-98. However, it will be recognized that these steps may be performed in tandem with other steps. That is, operations performed remotely at restricted area aggregator 16 are discussed first, although it should be noted that this does not imply that these operations are executed prior to those discussed subsequently. The collection and dissemination of restricted area data to the individual controllers 14 is described next with reference to FIGS. 3A and 3B, before returning to how intrusion prevention module 30 utilizes this information to prevent intrusions.

At step 68 (shown in FIG. 3B), expiration of a timer utilized to determine when to request data from restricted area data sources 18. In other embodiments, other mechanisms may be utilized to determine when to request or prepare to receive restricted area data. At step 70, in response to expiration of the timer, a request is made to remote restricted area data sources 18 for updated information. The request is received by restricted area data sources 18 at step 72, and at step 74 the requested restricted area data is transmitted from restricted area data sources 18 to restricted area aggregator 16. In one embodiment, restricted area data includes only that data that has been recently updated or newly added, not all restricted area data stored or otherwise maintained by remote restricted area data sources 18.

At step 76, the restricted area data provided by remote restricted area data sources 18 is received by restricted area aggregator 16. At step 78, the received restricted area data is translated into a common format prior to storage to restricted area database 44. At step 80, the formatted restricted area data is buffered or stored to restricted area database 44, and the timer used to determine when to request updated data is reset. Restricted area data includes the geographic boundaries of the restricted areas, type of restrictions associated with the area (e.g., altitude restrictions, aircraft restrictions, time of day restrictions, etc.), and information on how to gain access to the restricted area (e.g., notification, request, etc.). As described previously, restricted area database 44 may be organized as a geographic database that is searchable based on proximity to a particular location. This type of database configuration is particularly beneficial when the restricted area data to be stored represents an update to data already stored in the database. A database organized by geography allows data previously stored with respect to a particular geographic area to be located and updated or replaced.

In addition to receiving updates from restricted area data sources (e.g., from remote publishers of restricted area data), restricted area aggregator 16 may also receive restricted area data from the owners of restricted areas via restricted area creation module 41. In one embodiment, restricted area creation module 41 is a graphical user interface (GUI) made available by restricted area aggregator 16 that allows an administrator and/or owner to graphically define the boundaries of a restricted area as indicated at step 82. This may include providing a variety of tools which allow the user/administrator to draw geometric shapes, such as rectangles and circles, or allow a user to draw an arbitrary shape by defining a series of points. The interface also allows a user/admin to import a pre-existing set of restricted areas from a file in a well-known format. In addition, at step 82 the owner/administrator is able to define restrictions associated with the restricted area, including altitude restrictions, aircraft restrictions, time of day restrictions, etc., as well as information on how to gain access to the restricted area (e.g., notification, permission, etc.). At step 84, the administrator/owner uploads the information via restricted area creation module 41 and data translation module 42 to restricted area database 44. Restricted area data received from either remote restricted area data sources 18 and/or restricted area creation module 41 are both stored to restricted area database 44 in the same format.

At step 86, notification is provided to UAV controllers 14 regarding the availability of updated restricted area information. In other embodiments, the particular interactions between UAV controllers 14 and restricted area aggregator 16 may be varied (e.g., utilizing a different order of handshake operations to transfer updated restricted area data to UAV controllers 14). For example, updates may be provided automatically to individual UAV controllers 14 at regular intervals, rather than in response to a notification provided by restricted area aggregator 16. In the embodiment shown in FIG. 3, the notification is provided to all UAV controllers 14 in response to updated or new restricted area data. However, in other embodiment the notification is only provided to those UAV controllers 14 with respective UAVs 12 operating within a defined proximity of the updated restricted area data. However, this requires restricted area aggregator 16 to maintain information related to the location of UAVs 12. Restricted data aggregator 16 receives the notification of updated restricted area data availability at step 88.

At step 90, UAV controller 14 makes a request to restricted area aggregator 16 for the updated restricted area data. In the embodiment shown in FIG. 3, no additional information is required other than the request. However, in other embodiments additional information may be provided with the request, including position information associated with UAV 12 that may be utilized to extract only the restricted area data that is geographically relevant to UAV 12. At step 92, the request from UAV controller 14*a* is received by restricted data aggregator 16 (specifically, restricted area data interface 46).

At step 94, restricted area data interface 46 extracts restricted area data for provision to UAV controller 14, In the embodiment shown in FIG. 3, this includes only that restricted area data that has not been previously provided to UAV controller 14 (i.e., updated or new restricted area data). In other embodiments, restricted area data interface 46 may rely on positional data provided by UAV controller 14 to extract only geographically relevant positional data. At step 96, extracted restricted area data is transmitted to UAV controller 14*a*. At step 98, the transmitted restricted area data is received by restricted area interface 34, and included with data received from UAV 12*a* at step 66.

At step 100 (shown in FIG. 3A), based on positional data received from UAV 12*a* and restricted area data received from restricted area aggregator 16, a restricted area extract is generated. In the embodiment shown in FIG. 3A, the restricted area extract represents restricted area data relevant to the location of UAV 12*a*. This may be a subset of the total restricted area data available to intrusion prevention module 30, or may represent all the restricted area data available. The extract of restricted area data does not need to be overly precise, but simply acts to reduce the amount of data that must be scrutinized during the subsequent intrusion calculation step. In the embodiment shown in FIG. 3A, intrusion prevention module 30 acts to both remedy on-going intrusions into restricted areas and prevent future intrusions. On-going intrusions are detected based on the current position of UAV 12*a* relevant to the restricted area extract generated at step 102, while future/predicted intrusions are based on the predicted location of UAV 12*a*.

At step 102, intrusion prevention module 30 compares the current position (e.g., most recent information related to the position/direction/speed) and predicted position of UAV 12*b* with the most recently updated restricted area data. At step 104, the comparison is utilized to determine whether UAV 12*a* is currently located within a restricted area or predicted to be located within a restricted area. If UAV 12*a* is not currently located within a restricted area and not predicted to enter a restricted area in the near future, then no remedial measures are necessary and the process ends at step 106. In the embodiment shown in FIG. 3, if it is determined that UAV 12*a* is currently within a restricted area or predicted to enter a restricted area in the near future, then at step 108 a determination is made whether the owner of UAV 12*a* and the owner of the restricted area space in which UAV 12*a* resides belong to the same owner and/or organization. In other embodiments, information regarding the owner of the restricted area may not be available, in which case this step would be omitted. If it is determined that the restricted area in which UAV 12*a* currently resides are co-owned, then no remedial measures are necessary and the process again ends at step 110. If the restricted area in which UAV 12*a* currently resides are not co-owned, then at step 112 a determination is made regarding the type of restriction associated with the restricted area. As described above, restricted area data may include information regarding restrictions particular to a particular restricted area. For example, restrictions may include restrictions above or below a particular altitude (e.g., aircraft are permitted above 2,000 ft.). In another example, restrictions may include the type of aircraft permitted/restricted from entering the restricted area, and/or the hours of operation in which aircraft are permitted to enter the restricted area. Finally, the restriction type may include information regarding how to request access to enter the restricted area, if possible.

Figure 3A:
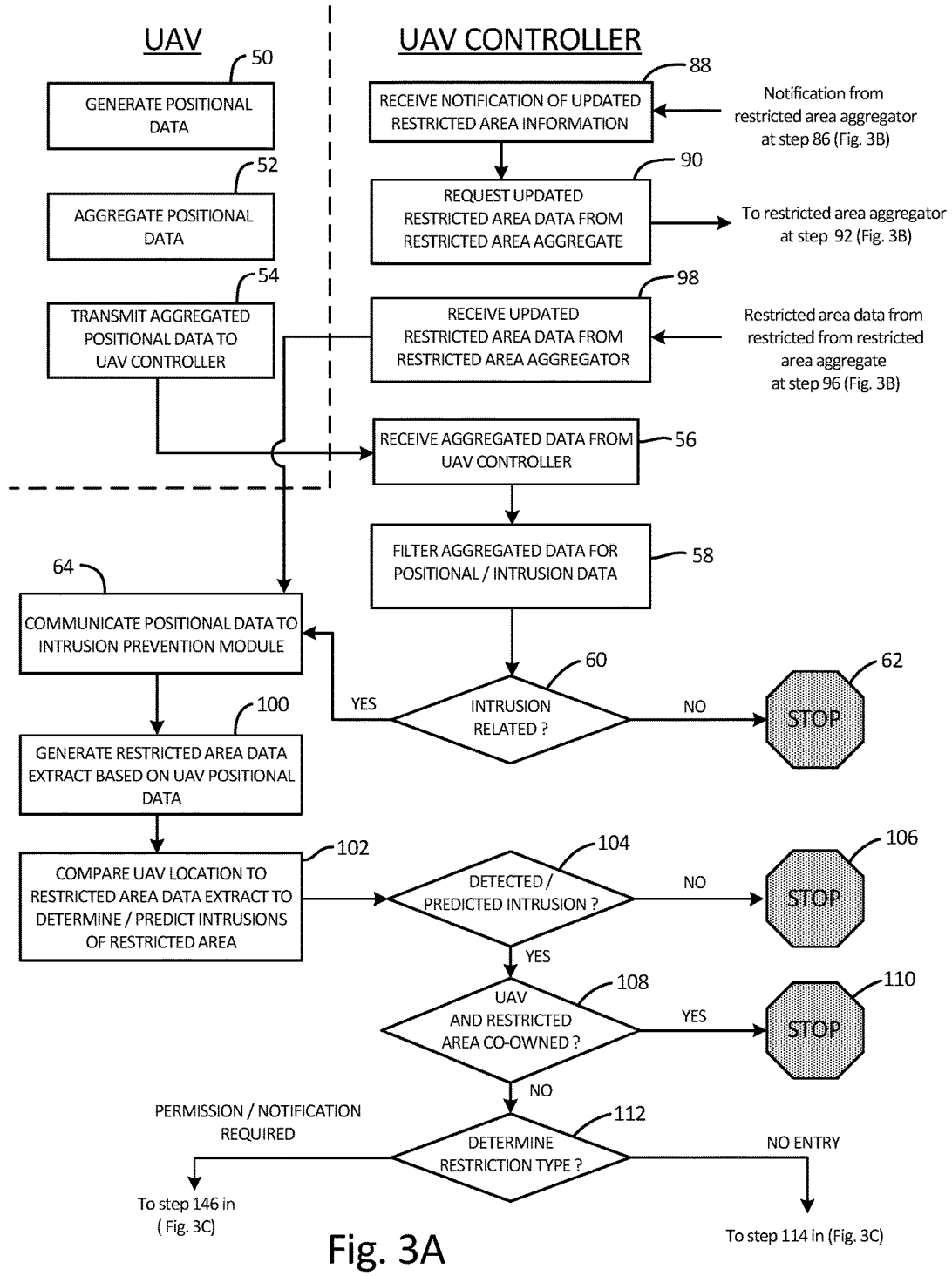
FIGS. 3A-3D represent a flowchart that illustrates steps performed by various components of the restricted area avoidance system according to an embodiment of the present invention.
Figure 3B:
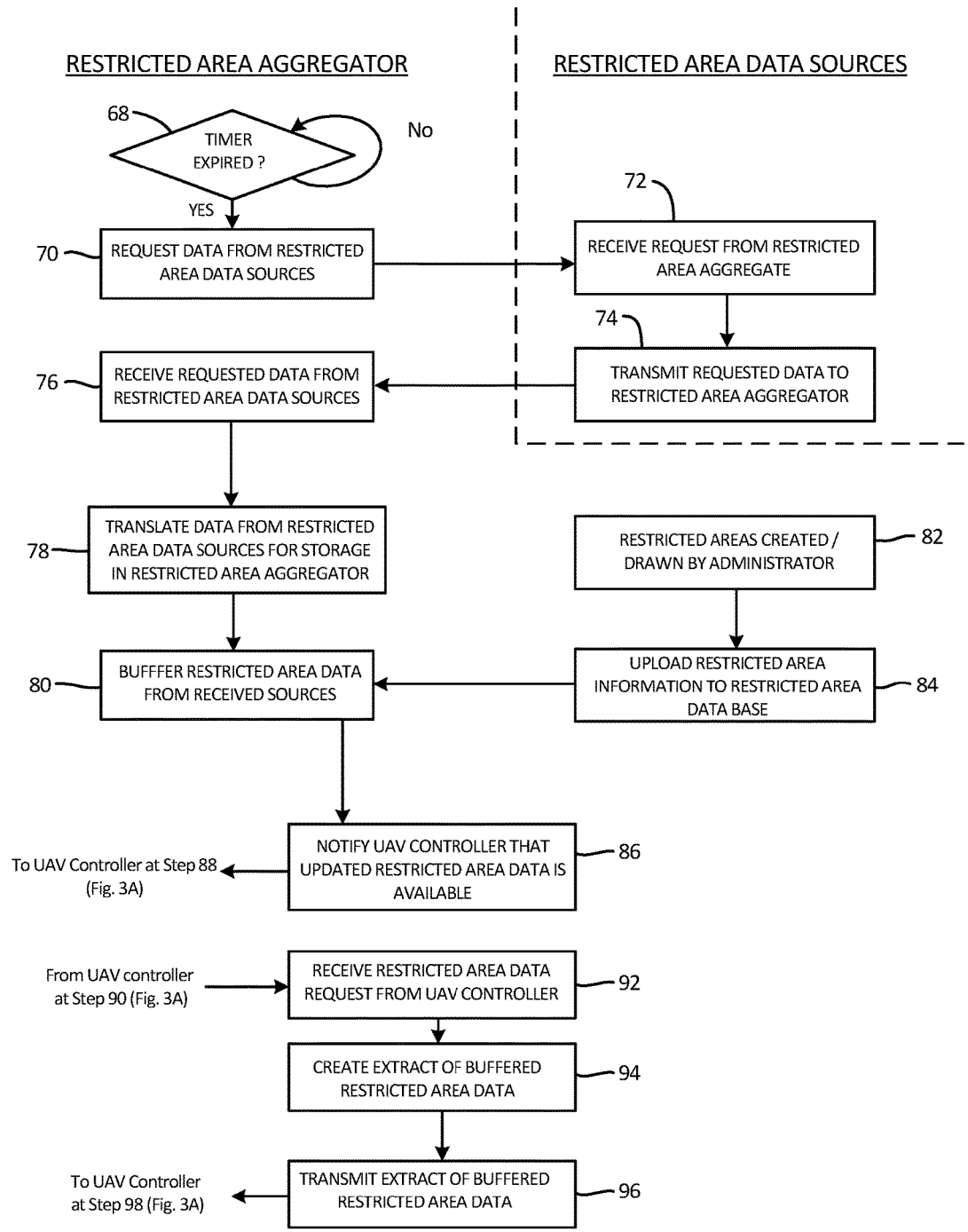
Figure 3C:
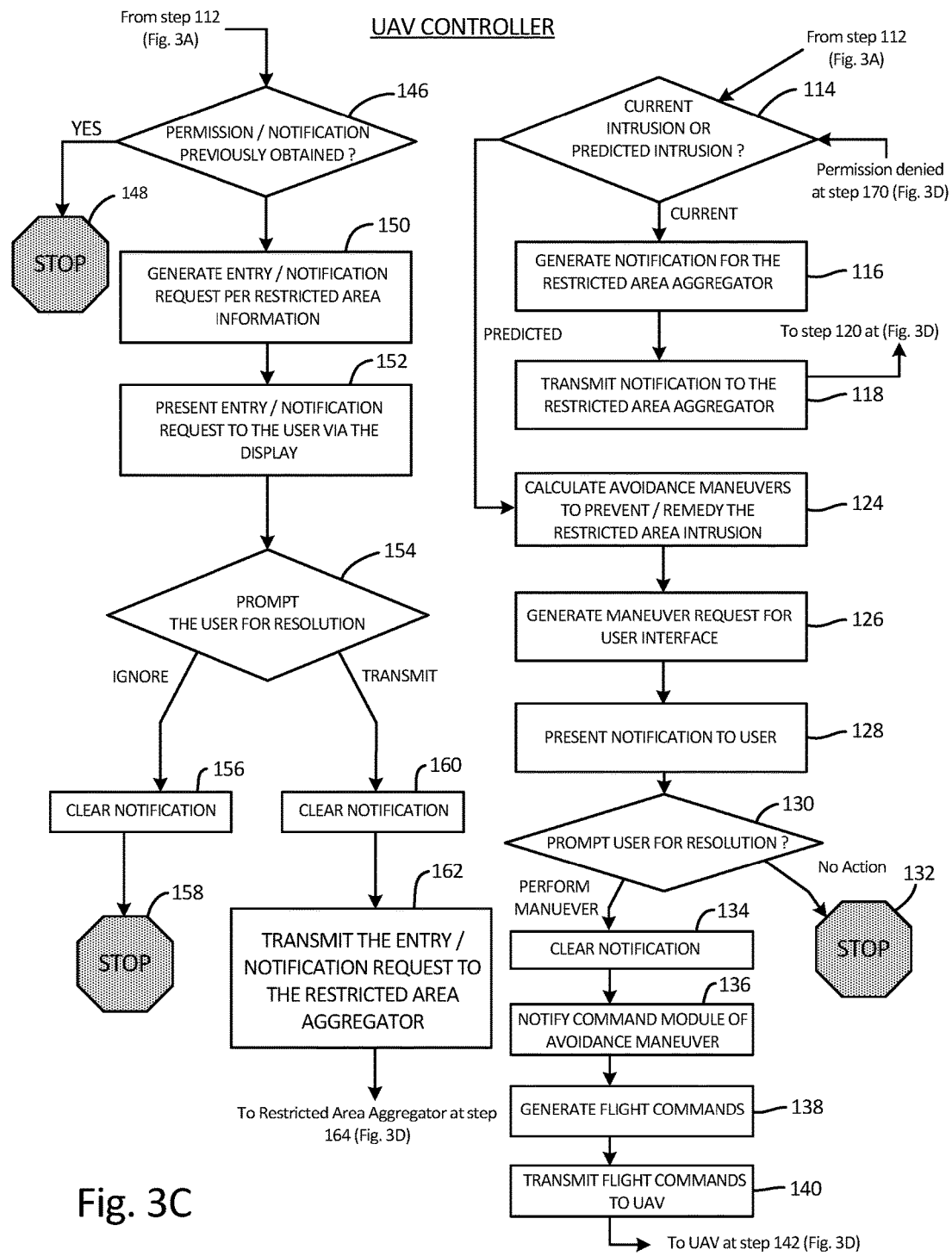
Figure 3D:
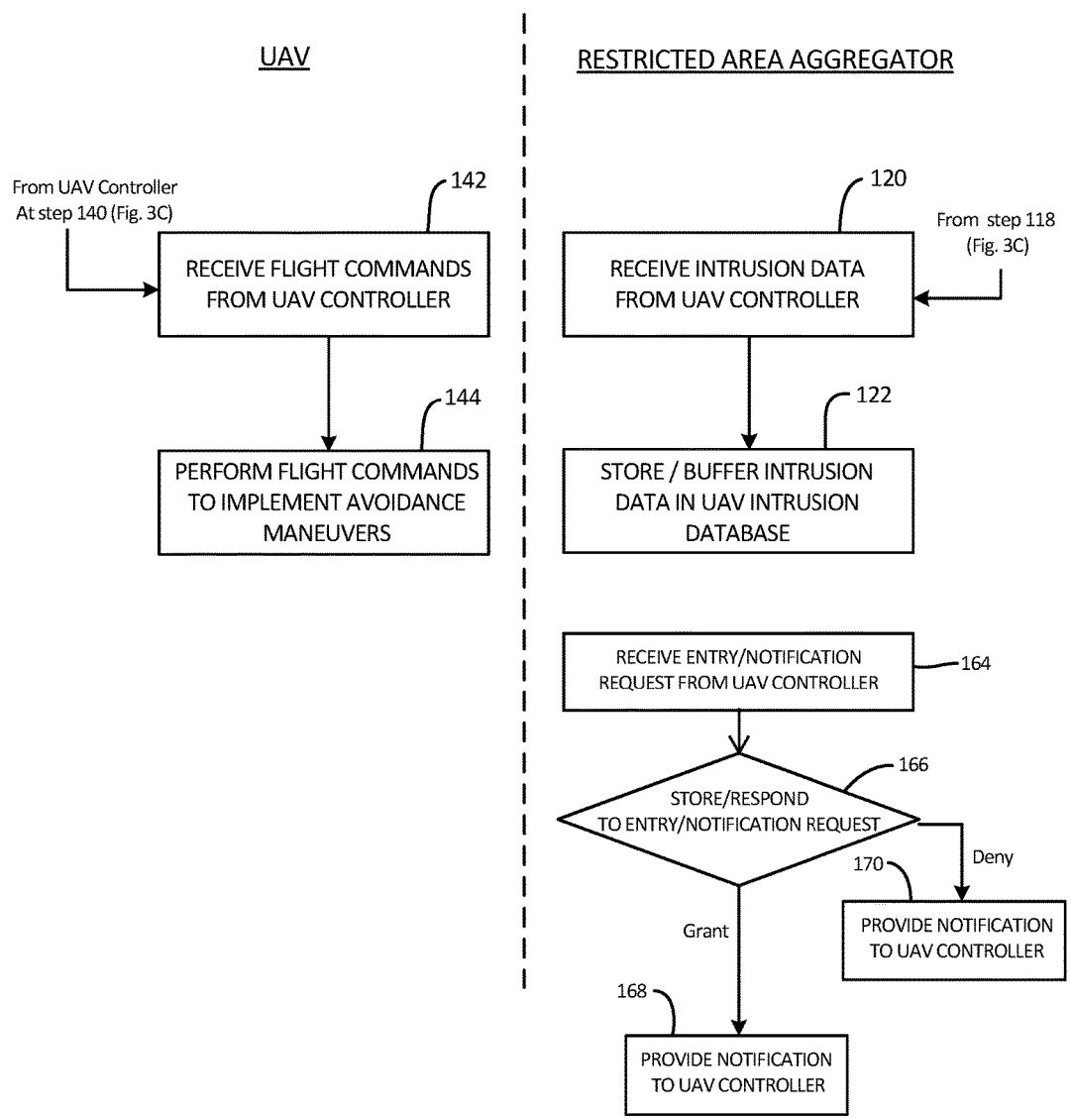

In the embodiment shown in FIG. 3A, a determination is made at step 112 regarding whether any action is available to UAV 12a to remedy the entry into the restricted area. If at step 112 it is determined that no entry is allowed into the restricted area, then at step 114 (shown in FIG. 3C), a determination is made whether the intrusion is current (i.e., has already occurred) or is predicted. If the intrusion is current (i.e., UAV 12a is currently located within the restricted area), then at step 116 intrusion data is collected and a notification is generated that include the collected intrusion data for provision to the restricted area aggregator 16. In the embodiment shown in FIG. 3C, this includes sending a notification to restricted area interface 34 information related to the breach of the restricted area (i.e., intrusions data). This may include information regarding the restricted area that was breached, identification of the UAV responsible for the breach, the location/time of UAV 12a when the breach was discovered, etc. At step 118, the intrusion data collected by UAV controller 14a and provided to restricted area interface 34 is transmitted to restricted area aggregator 16. At step 120 (shown in FIG. 3D), the intrusion data provided by UAV controller 14a is received by restricted area aggregator 16, and at step 122 is stored or buffered in UAV restricted area intrusion database 38. Intrusion data may be subsequently accessed and utilized to notify the owner of the restricted area regarding the intrusion, or may be accessed by a third-party.

In addition to recording the detected intrusion with restricted area aggregator 16, at steps 124-144, action is taken on behalf of UAV 12a to remedy the intrusion into the restricted area. If at step 114 it is determined that the intrusion is merely predicted rather than current, then no reporting is required as described with respect to steps 116-122, and the process continues to step 124, in which intrusion avoidance calculations are generated to prevent and/or remedy the restricted area intrusion. Intrusion avoidance calculations performed by intrusion prevention module 30 includes comparing the position (including in some embodiments, altitude) of UAV 12a, the position of UAV controller 14a (for the purpose of determining, in some embodiments, the home base or origin of UAV 12a), and the boundaries of the restricted area. Intrusion prevention module 30 then performs a number of calculations to determine the nearest point to maneuver to remove UAV 12a from the restricted area. In one embodiment, six points are calculated—a remediation maneuver point to the north, south, east, and west, as well as a remediation maneuver that includes climbing or descending in altitude. The point existing outside of the restricted area that is closets to UAV 12a is then selected. In another embodiment, a set of points are generated at random (e.g., random directions), and the point that is both outside of the restricted area and the shortest distance from UAV 12a is selected. In other embodiments, the position of the UAV controller 14a is utilized as a weighting factor in determining which point to use, or in other embodiments is utilized to break ties in distance between two points, with the point located closest to the position of UAV controller 14a winning out. A number of calculations may be utilized to perform the remediation, including locating the shortest route to an area outside of the restricted area. In other embodiments, depending on the particular restrictions associated with the restricted area, this may include changing the altitude and/or speed of UAV 12a to accommodate particular restrictions associated with the restricted area. For example, if a restricted area has altitude restrictions, the remedial action calculated may include increasing the altitude of UAV 12a to remedy the intrusion. In other embodiments, this may include calculating where UAV 12a entered the restricted area and simply calculating a route to exit the restricted area and the point of entrance. This has the benefit—in some cases—of allowing a pilot or owner of UAV 12a to retrieve the UAV. In instances in which the calculated remedial position results in UAV 12 intruding within a different restricted area, the process begins again to calculate a different remedial position.

Based on the remediation calculations performed by intrusion prevention module 30 at step 124, at step 126 a maneuver request is generated for display to the user via the user interface. The maneuver request may display the predicted/current intrusion, as well as the avoidance maneuver selected to prevent/remedy the intrusion. At step 128, the notification is presented to the user, and at step 130 the user is prompted for resolution. In the embodiment shown in FIG. 3C, the user may elect to ignore the suggested avoidance maneuver or perform the maneuver, in which case the process ends at step 132, If at step 130 the user elects to perform the maneuver, then at step 134 the intrusion notification is cleared and at step 136 a notification is provided to the command module 36 (shown in FIG. 2) indicating performance of the avoidance maneuver. At step 138, command module 138 generates flights commands required to perform the intrusion avoidance maneuvers, and at step 140 transmits the generated flight commands to UAV 12a. At step 142, the flight commands are received by UAV 12, and at step 144 the flight commands are utilized to perform the avoidance maneuver. Having reached the safe point—which represents a position that does not present an intrusion issue—control of UAV 12 returns to the user and process restarts with positional data being utilized to determine/predict intrusions within restricted areas.

Returning to step 112, if it is determined that UAV 12a has entered a restricted area that may be entered pending notification or permission of the owner of the restricted area, then at step 146 intrusion prevention module 30 determines whether the proper notification has been provided. Although restricted areas will typically require either notification or permission, both of these mechanisms for gaining access to a restricted area are described together. The only difference being that a request for permission must be granted by the owner, whereas notification typically only requires the user to provide the notification, without requiring a response from the user. In one embodiment, intrusion prevention module 30 maintains a local buffer of restricted area entry declarations that can be checked to determine if a notification has been sent with respect to the restricted area in question. In another embodiment, this may require intrusion prevention module 30 to communicate either with restricted area aggregator 16 or directly with the owner of the restricted area in order to determine whether the proper notification has been provided. If the proper notification has been provided, as determined at step 146, then the entry of UAV 12a into the restricted area is not an intrusion and the process ends at step 148. If the proper notification has not been provided, then at step 150 intrusion prevention module 30 generates the required notification/request and logs the notification in the local buffer to prevent duplicate notifications from being generated. In one embodiment, this includes identifying information related to UAV 12a, including owner/pilot of the aircraft and type of aircraft. In other embodiments, this may further include the location of UAV 12a, expected duration of operating time within the restricted area, and/or flight path plan. In the embodiment shown in FIG. 3C, at step 152 the notification/request generated at step 150 is presented to the user/pilot for review via display 32. The user may modify or augment the generated notification/request. In other embodiments, the notification/request may be transmitted directly to the required parties (i.e., owner of the restricted area). At step 154, the user/pilot is prompted for resolution of the generated notification, which may include ignoring the notification or transmitting it to the required parties. If at step 154, the user/pilot decides to ignore the notification, then at step 156 the notification is cleared and the process ends at step 158. If the user/pilot decides to transmit the notification, then at step 160 the notification is cleared from UAV controller 14a and the notification is communicated at step 162 to the required parties. In some embodiments, this may include communicating the entry/notification request directly to the owner of the restricted area. In the embodiment shown in FIG. 3C, this includes transmitting the entry/notification request to the restricted area aggregator 16. At step 164, the entry/notification request is received by restricted area aggregator 16. At step 166 the entry/notification request is acted on. In embodiments in which only notification is required, then at step 166 the notification is stored to restricted area intrusion/UAV database 38 along with identifying information associated with the UAV to maintain record of the notification. A similar record may be stored locally by intrusion prevention module 30 within UAV controller 14a. In embodiments in which entry request must be granted, review of the entry request may be provided automatically via review of the request to determine whether the request complies entry request rules, or may be provided to the owner/administrator of the restricted area for review and a determination of whether to grant the request. If the request is granted, then at step 168 a notification is provided to UAV controller 14a allows UAV 12a to operate or continue operating in the restricted area. If the request is denied at step 166, then at step 170 a notification is provided to UAV controller 14a regarding the denied entry request, in the embodiment shown in FIG. 3D, if the request is denied this is equivalent to the restricted area being deemed a "no entry" area, and the process continues at step 114 (shown in FIG. 3C) as described above in instances in which the restriction type indicates no entry. In this way, despite an intrusion or predicted intrusion into a restricted area, intrusion prevention module 30 may be able to remedy the intrusion without altering the flight path of UAV 12a. In cases in which the intrusion cannot be remedied—such as if the owner of the restricted area denies the request to enter the restricted area—then avoidance/remedial maneuvers may be required to remedy or prevent an intrusion of the restricted area.

In this way, the intrusion prevention system monitors and detects intrusions as they happen, and provides for remediation of detected intrusions, whether by generating flight commands to remove UAV 12a from the restricted area or by providing the necessary notifications or requests to entry to the owner of the restricted area While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A restricted area intrusion avoidance system comprising:
an unmanned aerial vehicle (UAV) that includes a positional sensor that determines a position of the UAV;
a restricted area aggregator that collects and stores restricted area data, wherein the restricted area aggregator is searchable by location to provide spatially relevant restricted area data; and
a UAV controller coupled to communicate with the UAV and the remotely located restricted area aggregator, wherein the UAV controller receives flight data and position data from the UAV and provides the UAV with flight control instructions, wherein the UAV controller provides position data to the restricted area aggregator and receives in response spatially relevant restricted area data from the restricted area aggregator, wherein the UAV controller includes an intrusion prevention module that determines based on the received positional data and the received restricted area data whether the UAV is currently intruding within a restricted area or is predicted to intrude within a restricted area, wherein in response to a detected intrusion the UAV controller generates a plurality of remediation maneuver points and automatically selects a remediation maneuver point that is both located outside of the restricted area and in close proximity to the current location of the UAV or presents to a user via a display the plurality of remediation maneuver points and prompts the user for a selection, wherein the selected remediation maneuver point is provided to the UAV as a flight control instruction to remedy or prevent the intrusion, wherein the intrusion prevention module includes a local database for storing the spatially relevant restricted area data provided by the restricted area aggregator.

2. The restricted area intrusion avoidance system of claim 1, wherein the UAV controller includes a display screen, wherein the intrusion prevention module displays information regarding the position of the UAV and location/boundaries of restricted areas on the display screen for review by a user.

3. The restricted area intrusion avoidance system of claim 2, wherein the intrusion prevention module receives information from the restricted area aggregator regarding notifications/permissions required to enter restricted areas, wherein the notifications/permissions are displayed to the user via the display screen.

4. The restricted area intrusion avoidance system of claim 2, wherein the selected remediation maneuver point is presented to the user via the display screen and prompts the user for resolution of whether the selected remediation maneuver point should be executed, wherein if executed the remediation maneuver point is communicated to the UAV to implement.

5. The restricted area intrusion avoidance system of claim 1, wherein the restricted area aggregator includes a geo-spatial restricted area database that is searchable by position to provide spatially relevant information regarding restricted areas.

6. The restricted area intrusion avoidance system of claim 5, wherein the restricted area aggregator includes a restricted area intrusion/UAV database that maintains records related to intrusions within restricted areas by UAVs.

7. The restricted area intrusion avoidance system of claim 6, wherein records related to intrusions within restricted areas include at least one of identification of the UAV, owner of the UAV, time/duration of the intrusion, and location of the intrusion.

8. The restricted area intrusion avoidance system of claim 5, wherein the restricted area aggregator includes a restricted area creation module that receives restricted area data from restricted area owners/administrators regarding definition of restricted area boundaries, wherein the received restricted area data is stored to the geo-spatial restricted area database.

9. The restricted area intrusion avoidance system of claim 1, wherein the restricted area aggregator includes a restricted area data interface module that receives restricted area data from third-party restricted area data sources regarding definition of restricted area boundaries, wherein the received restricted area data is stored to the geo-spatial restricted area database.

10. The restricted area intrusion avoidance system of claim 1, wherein the generation of a plurality of remediation maneuver points includes generation of a remediation maneuver point to the north, south, east, west, vertically up, and vertically down.

11. The restricted area intrusion avoidance system of claim 1, wherein a position of the UAV controller is utilized as a factor in selecting one of the plurality of remediation maneuver points.

12. The restricted area intrusion avoidance system of claim 1, wherein a point at which the UAV entered a restricted area is utilized as a factor in selecting of the plurality of remediation maneuver points.

13. A method of preventing restricted area intrusions, the method comprising:
receiving flight data provided by an unmanned aerial vehicle (UAV), wherein the flight data includes at least positional data describing position of the UAV, wherein the flight data is received by a UAV controller associated with the UAV;
requesting restricted area data from a restricted area aggregator, wherein the request include positional data received from the UAV;
receiving spatially relevant restricted area data from the restricted area aggregator, wherein the spatially relevant restricted area data is received and stored by the UAV controller;
determining a risk of intrusion based on a comparison of the flight data received from the UAV and the spatially relevant restricted area data received from the restricted area aggregator;
calculating avoidance maneuvers in response to a determined risk of intrusion;
displaying a map to a user that identifies the position of the UAV, corresponding spatially relevant restricted area, and calculated avoidance maneuvers and the user is prompted for action; and
communicating the calculated avoidance maneuver selected by the user to the UAV as a flight control instruction to remedy and/or prevent an intrusion.

14. The method of claim 13, wherein the received spatially relevant restricted area data includes information regarding owner of the restricted area and notification requirements for entering the restricted area.

15. The method of claim 14, further including generating an entry request notification and transmitting the entry request notification to the owner of the restricted area.

16. The method of claim 13, wherein the calculated avoidance maneuvers are automatically provided to the UAV to prevent intrusion within the restricted area.

17. An unmanned aerial vehicle (UAV) controller comprising:
a controller interface coupled to communicate bi-directionally with an unmanned aerial vehicle (UAV), wherein the controller interface receives flight data from the UAV and provides flight commands to the UAV, wherein flight data includes position information associated with the UAV;
a restricted area interface coupled to communicate bi-directionally with a restricted area aggregator, wherein the restricted area interface provides a request to the restricted area aggregator for spatially relevant restricted area data, wherein the request includes position information received from the UAV, and wherein the restricted area aggregator selects spatially relevant restricted area data based on the position information received from the restricted area interface; and
an intrusion prevention module that compares flight data received from the UAV with spatially relevant restricted area data to determine a risk of intrusion within a restricted area and calculates avoidance maneuvers to prevent the UAV from entering a restricted area; and
a display for presenting to a user the location of the UAV, the location of spatially relevant restricted areas, and avoidance maneuvers calculated to prevent the UAV from entering a restricted area or to remove the UAV from a restricted area, wherein the controller interface communicates a calculated avoidance maneuver to the UAV as a flight control instruction to remedy and/or prevent an intrusion of a restricted area.

18. The UAV controller of claim 17, wherein the intrusion prevention module calculates avoidance maneuvers to prevent the UAV from entering a restricted area and provides the calculated avoidance maneuvers to the controller interface for provision to the UAV.

19. The UAV controller of claim 18, further including a display, wherein the intrusion prevention module provides information regarding restricted areas and calculated avoidance maneuvers to the display for review by a user.

* * * * *